(12) United States Patent
Wei

(10) Patent No.: US 9,539,933 B2
(45) Date of Patent: Jan. 10, 2017

(54) AUTOMOTIVE LAMP

(71) Applicant: JUTE INDUSTRIAL CO., LTD., Taichung (TW)

(72) Inventor: Shih-Chieh Wei, Taichung (TW)

(73) Assignee: JUTE INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 14/711,338

(22) Filed: May 13, 2015

(65) Prior Publication Data

US 2016/0311360 A1 Oct. 27, 2016

(30) Foreign Application Priority Data

Apr. 21, 2015 (TW) .............................. 104112673 A

(51) Int. Cl.
*B60Q 1/00* (2006.01)
*F21S 8/10* (2006.01)

(52) U.S. Cl.
CPC ........... *B60Q 1/0088* (2013.01); *F21S 48/328* (2013.01)

(58) Field of Classification Search
CPC ................... F21Y 2105/005; F21Y 2111/005; F21K 9/10; F21K 9/135; B60Q 1/0088
USPC ....................................................... 362/487
See application file for complete search history.

(56) References Cited

U.S. PATENT DOCUMENTS

| 6,837,602 B1* | 1/2005 | Lee | ..................... | B60Q 1/0052 |
| | | | | 362/330 |
| 7,690,813 B2* | 4/2010 | Kanamori | ................. | F21K 9/00 |
| | | | | 361/704 |
| 2003/0063476 A1* | 4/2003 | English | ................ | B60Q 1/2696 |
| | | | | 362/545 |
| 2007/0097678 A1* | 5/2007 | Yang | ....................... | F21V 23/06 |
| | | | | 362/227 |
| 2009/0135595 A1* | 5/2009 | Chen | ........................ | H05K 1/14 |
| | | | | 362/235 |
| 2009/0290349 A1* | 11/2009 | Chu | ....................... | F21S 48/328 |
| | | | | 362/249.02 |
| 2009/0296386 A1* | 12/2009 | Wang | ....................... | F21K 9/00 |
| | | | | 362/235 |
| 2010/0073924 A1* | 3/2010 | Deng | ...................... | F21K 9/232 |
| | | | | 362/231 |
| 2013/0176707 A1* | 7/2013 | Audette | ................... | F21V 29/20 |
| | | | | 362/84 |
| 2013/0201700 A1* | 8/2013 | Tamura | ................. | F21V 23/004 |
| | | | | 362/382 |
| 2013/0322076 A1* | 12/2013 | Parker | .................. | G02B 6/0075 |
| | | | | 362/240 |
| 2014/0321126 A1* | 10/2014 | Narag | .................... | H05K 1/189 |
| | | | | 362/306 |

FOREIGN PATENT DOCUMENTS

| CN | 202203721 U | 4/2012 |
| CN | 203099714 U | 7/2013 |

* cited by examiner

*Primary Examiner* — Bryon T Gyllstrom

(74) *Attorney, Agent, or Firm* — Muncy, Geissler, Olds & Lowe, P.C.

(57) ABSTRACT

An automotive lamp is provided, including a circuit board, at least one carrier and at least one light-emitting element. The carrier is connected with the circuit board obliquely. Each carrier carries at least one said light-emitting element, and the at least one element is electrically connected with the circuit board.

10 Claims, 5 Drawing Sheets

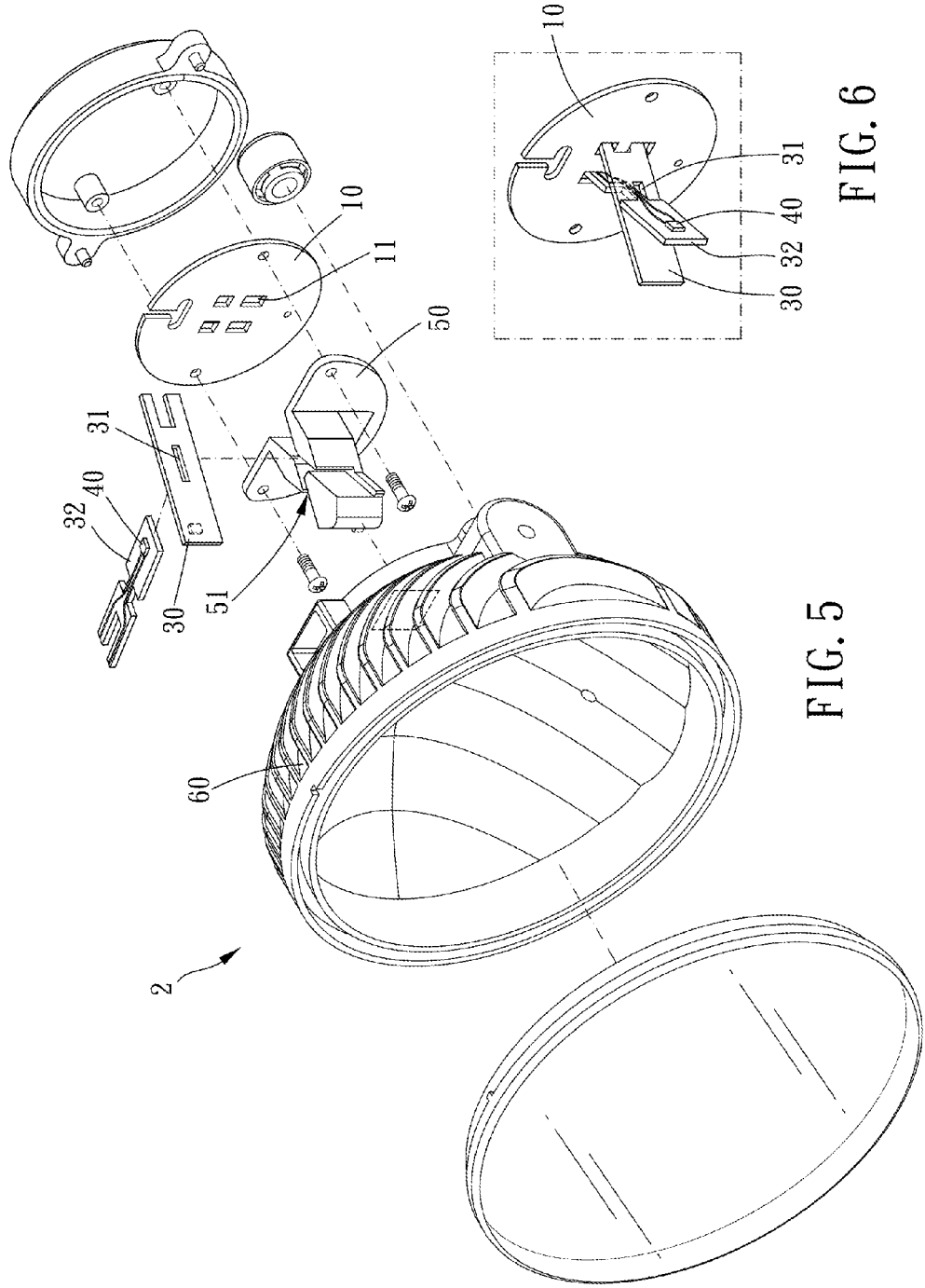

AUTOMOTIVE LAMP

BACKGROUND OF THE INVENTION

1. Field of the Invention

The present invention relates to a lamp, and more particularly to an automotive lamp.

2. Description of the Prior Art

Usually, in a conventional automotive lamp, an oblique lamp slot is recessed in a heat dissipating base to allow a light-emitting element to be arranged therein in an angle. A light emitted by the light-emitting element irradiates on an optical reflection face of the lamp cover, and the light is reflected by the optical reflection face and projected through a frontal lamp cover.

However, in this type of conventional automotive lamp, a cathode lead wire and an anode lead wire are further needed to connect the light-emitting element and the circuit board, so the automotive lamp needs more space. In addition, two lead wire holes are disposed through the heat dissipating base and a lamp shell for the lead wires to be disposed therethrough and connected with the light-emitting element disposed in the lamp slot. It is dangerous that the cathode and anode lead wires are exposed.

The present invention has arisen to mitigate and/or obviate the afore-described disadvantages.

SUMMARY OF THE INVENTION

The major object of the present invention is to provide an automotive lamp in which a carrier carrying a light-emitting element is obliquely connected with the circuit board, and the carrier can be provided with, for example, a printed circuit. Then, the circuit board and the light-emitting member can be electrically connected with each other without lead wires and lead wire holes, so the present invention is space-saving and less complicated.

To achieve the above and other objects, an automotive lamp of the present invention is provided, including a circuit board, at least one carrier and at least one light-emitting element. The carrier is obliquely connected with the circuit board, each carrier carries at least one said light-emitting element, and the at least one light-emitting element is electrically connected with the circuit board.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 5 is a breakdown drawing of a second preferred embodiment of the present invention;

FIG. 6 is a partial perspective drawing of the second preferred embodiment of the present invention;

DETAILED DESCRIPTION OF THE PREFERRED EMBODIMENTS

Figure 1:
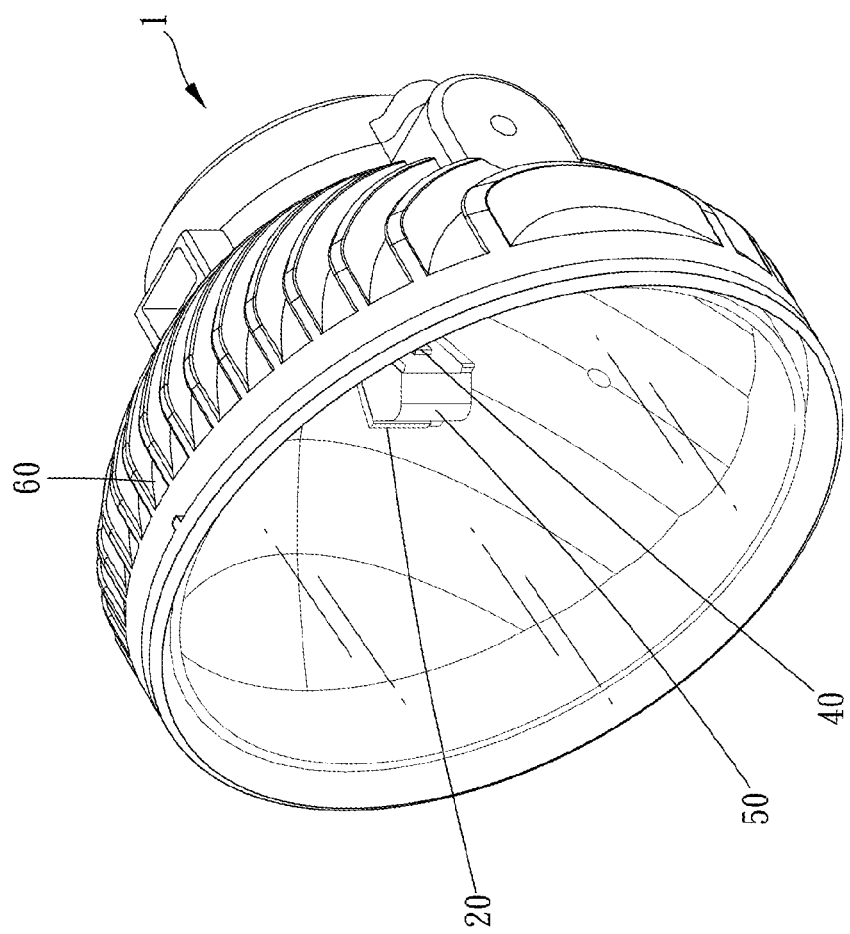
FIG. 1 is a perspective drawing of a first preferred embodiment of the present invention.
Figures 2, 3:
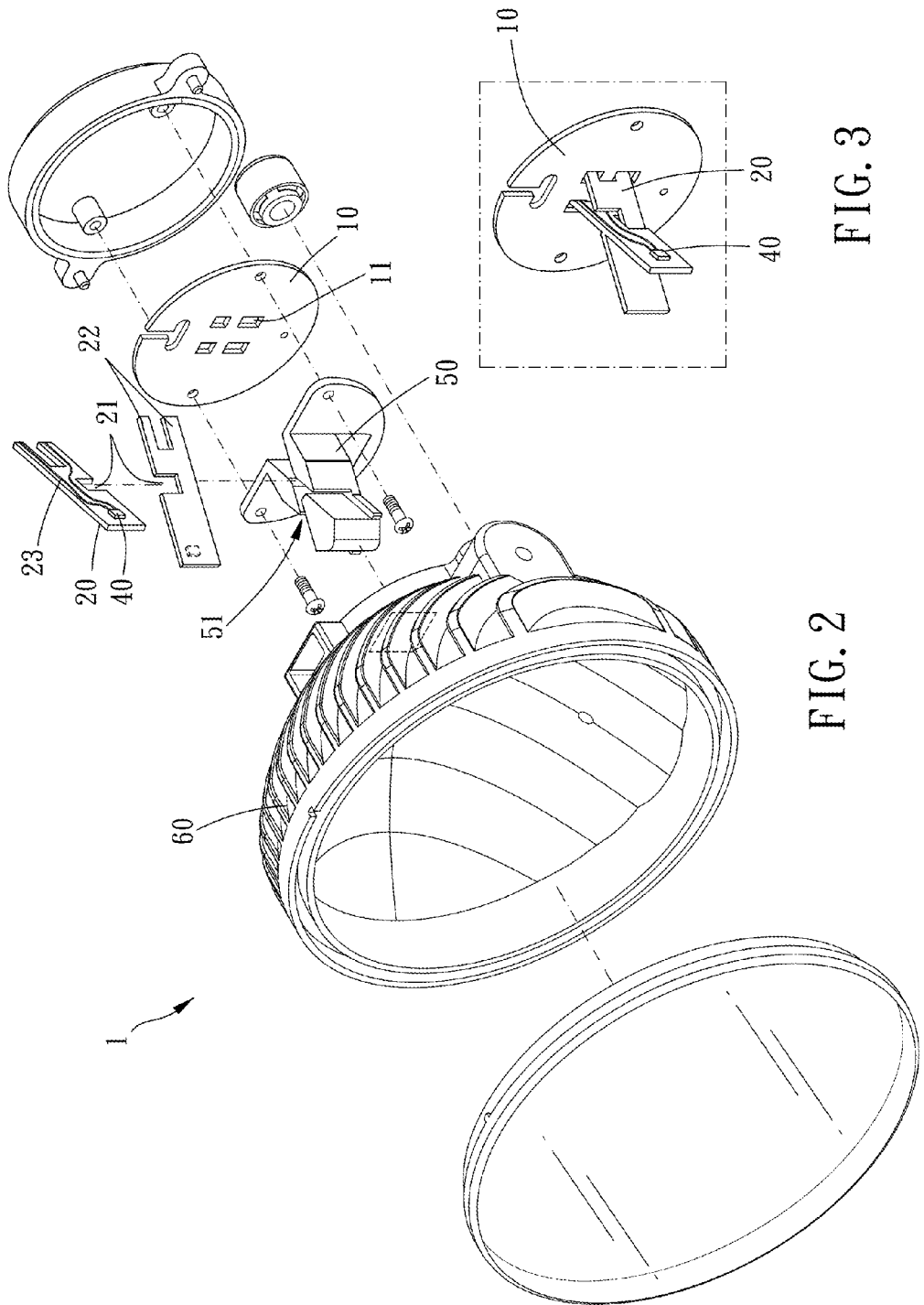
FIG. 2 is a breakdown drawing of the first preferred embodiment of the present invention.
FIG. 3 is a partial perspective drawing of the first preferred embodiment of the present invention.
Figure 4:
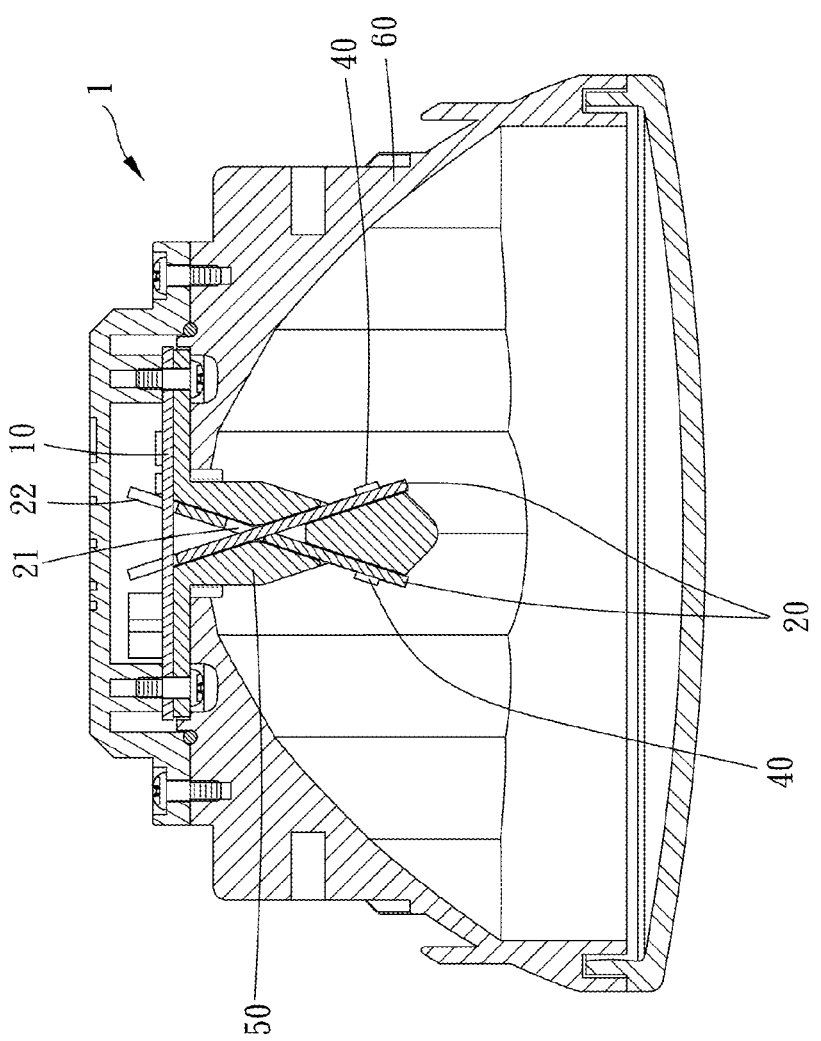
FIG. 4 is a cross-sectional drawing of the first preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 4 for a first preferred embodiment of the present invention. An automotive lamp 1 includes a circuit board 10, at least one carrier 20 and at least one light-emitting element 40.

The carrier 20 is obliquely connected with the circuit board 10, and each carrier 20 carries at least one said light-emitting 40. In this embodiment, each carrier 20 carries only one light-emitting element 40. It is understandable that each carrier may carry a plurality of light-emitting elements to increase illumination brightness. Preferably, the light-emitting element 40 is an Light-Emitting Diode. Furthermore, each carrier 20 has two inserting lugs 22, and each inserting lug 22 is inserted into an inserting hole 11 of the circuit board 10. Each carrier 20 is connected with the circuit board 10 via the two inserting lugs 22 by welding or other appropriate ways, and the carrier 20 may be formed with one or more than two inserting lugs.

The at least one light-emitting element 40 is electrically connected with the circuit board 10. Specifically, each carrier 20 is provided with a circuit 23 which is electrically connected with the circuit board 10. More specifically, the circuit 23 is a printed circuit, and it is understandable that each carrier may be provided without the circuit and further provided with lead wires to electrically connect the light-emitting element and the carrier. Furthermore, the carrier 20 is made of aluminum, so the carrier 20 has preferable heat dissipating efficiency; however, the carrier may be made of other materials.

In this embodiment, the automotive lamp 1 includes two the carriers 20 which are crossly arranged, and one of the two carriers has at least one notch 21. The two carriers 20 are assembled to each other via the at least one notch 21 so as to decrease the volume and the cost of the automotive lamp 1. Furthermore, the two carriers 20 are crossly assembled to each other via the notch 21 which is substantially rectangular to be X-shaped. It is understandable that the notch or the through opening may be in other shapes or numbers in accordance with various requirements.

The automotive lamp 1 further includes a heat dissipating base 50, and the heat dissipating base 50 is fixed on the circuit board 10. The carrier 20 is coupled to the heat dissipating base 50 to increase the heat dissipating effect of the light-emitting element 40 and the carrier 20 and to prevent the automotive lamp 1 from being damaged due to high temperature. In this embodiment, the heat dissipating base 50 has an engaging slot 51 which is substantially X-shaped, the two carriers 20 are restrictedly arranged in the engaging slot 51 and be fixed therein, and the two carriers 20 are coupled to the heat dissipating base 50. In other embodiments, the automotive lamp may be formed with the carrier having preferable heat dissipating effect instead of the heat dissipating base.

Figure 8:
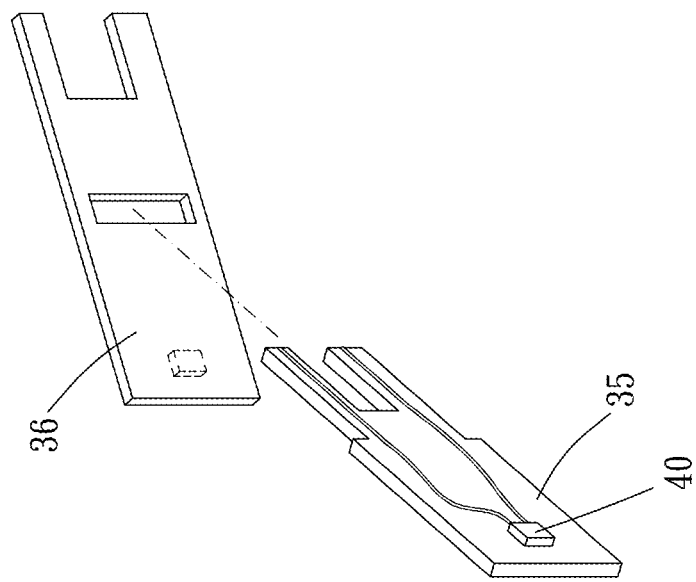
FIG. 8 is a drawing showing assembling of two carriers according to a fourth preferred embodiment of the present invention.
Figure 7:
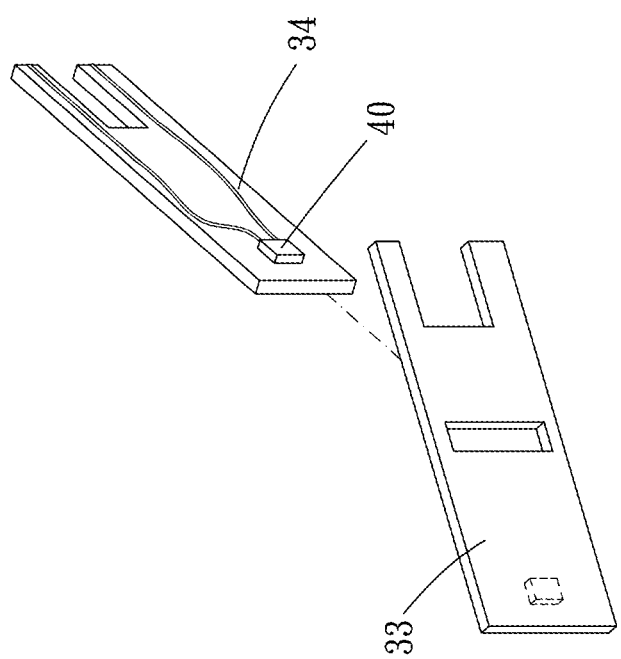
FIG. 7 is a drawing showing assembling of two carriers according to a third preferred embodiment of the present invention.

Please refer to FIGS. 5 and 6 for an automotive lamp 2 of a second embodiment. Compared with the first embodiment as shown in FIGS. 1 to 4, in the second embodiment, a carrier 30 is formed with a through opening 31, and the other carrier 32 is disposed through the through opening 31. In a third embodiment as shown in FIG. 7, a carrier 34 which has relatively smaller width is disposed through the other carrier 33 which has relatively greater width. In a fourth embodiment as shown in FIG. 8, a carrier 35 has a narrowed section for being disposed through one other carrier 36. It is understandable that each carrier may be formed with the notch for assembling, heat dissipation or visual effects.

In the embodiments as shown in FIGS. 1 to 8, the automotive lamp can further include a lamp cover 60. The circuit board 10 is fixedly disposed in the lamp cover 60, and the at least one carrier is disposed in the lamp cover 60. Furthermore, an inner side of the lamp cover 60 is a reflective surface which is parabolic so that a light emitted from the light-emitting element 40 disposed on the carrier 20 is reflected via the lamp cover 60.

Given the above, the automotive lamp of the present invention projects most of the light emitted from the light-emitting element to the lamp cover and the light is projected along the same direction more intensively so as to enhance illuminating effect.

In addition, the carrier of the automotive lamp is provided with the circuit, so an end of the carrier is electrically connected with the circuit board to prevent the lead wires from being exposed and occupying spaces.

Given the above, each carrier is formed with a notch, which is not disposed through the carrier, on a side thereof, so the assembled structure of a plurality of carriers is small in size so as to decrease interference with light. In addition, the notch (or the through opening) makes the two carriers crossly arranged to be X-shaped; therefore, the supporting effect of a suspending carrier which extends obliquely from the circuit board is elevated, and heat can be transmitted to the heat dissipating base quickly. Furthermore, the two carriers crossly arranged to be X-shaped are provided for an upper light-emitting element and a lower light-emitting element to be assembled thereto so as to make the light projected out more evenly.

While we have shown and described various embodiments in accordance with the present invention, it should be clear to those skilled in the art that further embodiments may be made without departing from the scope of the present invention.

What is claimed is:

1. An automotive lamp, including:
   a circuit board;
   two carriers, obliquely connected with the circuit board, the two carriers crossly arranged to be X-shaped;
   at least two light-emitting elements, each carrier carrying at least one of said light-emitting elements, the at least two light-emitting elements electrically connected with the circuit board;
   a heat dissipating base, having an engaging slot which is substantially X-shaped, the two carriers restrictedly arranged in the engaging slot;
   wherein at least one of the two carriers has at least one notch, and the two carriers are assembled to each other via the at least one notch.

2. The automotive lamp of claim 1, wherein the two carriers are coupled with the heat dissipating base.

3. The automotive lamp of claim 1, wherein the heat dissipating base is fixed on the circuit board.

4. An automotive lamp, including:
   a circuit board;
   two carriers, obliquely connected with the circuit board, the two carriers crossly arranged to be X-shaped;
   at least two light-emitting elements, each carrier carrying at least one of said light-emitting elements, the at least two light-emitting elements electrically connected with the circuit board;
   a heat dissipating base, having an engaging slot which is substantially X-shaped, the two carriers restrictedly arranged in the engaging slot;
   wherein one of the two carriers is formed with a through opening, and the other of the two carriers is disposed through the through opening.

5. The automotive lamp of claim 1, wherein each carrier is provided with a circuit which is electrically connected with the circuit board.

6. The automotive lamp of claim 1, further including a lamp cover, the circuit board fixed on the lamp cover, the two carriers disposed in the lamp cover.

7. The automotive lamp of claim 1, wherein the two carriers are made of aluminum.

8. The automotive lamp of claim 4, wherein each carrier is provided with a circuit which is electrically connected with the circuit board.

9. The automotive lamp of claim 4, further including a lamp cover, the circuit board fixed on the lamp cover, the two carriers disposed in the lamp cover.

10. The automotive lamp of claim 4, wherein the two carriers are made of aluminum.

* * * * *